United States Patent
Fusayasu et al.

(10) Patent No.: US 9,930,213 B2
(45) Date of Patent: Mar. 27, 2018

(54) IMAGE READING DEVICE GENERATING BLACK CORRECTION DATA FOR SHADE CORRECTION DETERMINED AT POSITIONS IN THE SUB-SCANNING DIRECTION BASED ON INTERMEDIATE DATA AND STORED REFERENCE BLACK CORRECTION DATA

(71) Applicant: Panasonic Intellectual Property Management Co., Ltd., Osaka (JP)

(72) Inventors: Hirotsugu Fusayasu, Kyoto (JP); Ryo Matsubara, Osaka (JP); Katsuo Inokuchi, Fukuoka (JP); Tatsuya Hirota, Fukuoka (JP); Yuuichi Tutiya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/363,390

(22) Filed: Nov. 29, 2016

(65) Prior Publication Data
US 2017/0078527 A1     Mar. 16, 2017

Related U.S. Application Data

(63) Continuation of application No. PCT/JP2016/001192, filed on Mar. 4, 2016.

(30) Foreign Application Priority Data

Mar. 27, 2015  (JP) ................................. 2015-067386

(51) Int. Cl.
*H04N 1/00*   (2006.01)
*H04N 1/028*  (2006.01)
(Continued)

(52) U.S. Cl.
CPC ......... *H04N 1/401* (2013.01); *H04N 1/00005* (2013.01); *H04N 1/00013* (2013.01);
(Continued)

(58) Field of Classification Search
CPC ........... H04N 1/00002; H04N 1/00013; H04N 1/00018; H04N 1/00034; H04N 1/00039;
(Continued)

(56) References Cited

U.S. PATENT DOCUMENTS 4,974,072 A     11/1990  Hasegawa
5,206,501 A  *   4/1993  Sakakibara .......... H04N 1/4078
                                              250/208.1
(Continued)

FOREIGN PATENT DOCUMENTS

JP     1-101061      4/1989
JP    02-254867     10/1990
(Continued)

OTHER PUBLICATIONS

International Search Report dated Apr. 5, 2016 in International (PCT) Application No. PCT/JP2016/001192.

*Primary Examiner* — Scott A Rogers
(74) *Attorney, Agent, or Firm* — Wenderoth, Lind & Ponack, L.L.P.

(57) ABSTRACT

An image reading device includes an image processor that generates correction data to be used for shading correction and perform the shading correction using the correction data, and a memory that stores first black correction data to be used for the shading correction in a main scanning direction in a predetermined first position in a predetermined sub-scanning direction. The image processor generates third black data based on an image signal of a second reference plate extending in the sub-scanning direction in a predetermined second position in the main scanning direction,
(Continued)

generates black correction data according to the sub-scanning direction based on the first black correction data and the third black data, and performs the shading correction using the black correction data so as to correct density unevenness in the main scanning direction and the sub-scanning direction caused by an interference between image signals from a plurality of sensors.

5 Claims, 16 Drawing Sheets

(51) Int. Cl.
  *H04N 1/031* (2006.01)
  *H04N 1/04* (2006.01)
  *H04N 1/12* (2006.01)
  *H04N 1/19* (2006.01)
  *H04N 1/191* (2006.01)
  *H04N 1/193* (2006.01)
  *H04N 1/40* (2006.01)
  *H04N 1/401* (2006.01)
  *H04N 1/21* (2006.01)

(52) U.S. Cl.
  CPC ..... *H04N 1/00018* (2013.01); *H04N 1/00034* (2013.01); *H04N 1/00039* (2013.01); *H04N 1/00045* (2013.01); *H04N 1/00053* (2013.01); *H04N 1/00063* (2013.01); *H04N 1/00068* (2013.01); *H04N 1/00082* (2013.01); *H04N 1/00087* (2013.01); *H04N 1/028* (2013.01); *H04N 1/031* (2013.01); *H04N 1/0311* (2013.01); *H04N 1/0318* (2013.01); *H04N 1/04* (2013.01); *H04N 1/12* (2013.01); *H04N 1/125* (2013.01); *H04N 1/19* (2013.01); *H04N 1/191* (2013.01); *H04N 1/193* (2013.01); *H04N 1/21* (2013.01); *H04N 1/40006* (2013.01); *H04N 1/40056* (2013.01); *H04N 2201/0081* (2013.01)

(58) Field of Classification Search
  CPC ............ H04N 1/00045; H04N 1/0005; H04N 1/00053; H04N 1/00063; H04N 1/00068; H04N 1/00082; H04N 1/00087; H04N 1/028; H04N 1/02885; H04N 1/047; H04N 1/40; H04N 1/40006; H04N 1/401; H04N 1/407; H04N 1/6027
  See application file for complete search history.

(56) References Cited

U.S. PATENT DOCUMENTS

| | | | |
|---|---|---|---|
| 5,371,613 A * | 12/1994 | Arimoto | H04N 1/401 |
| | | | 358/461 |
| 6,151,419 A | 11/2000 | Aoki | |
| 7,126,725 B2 * | 10/2006 | Okutomi | H04N 1/1013 |
| | | | 358/474 |
| 7,391,533 B2 | 6/2008 | Hiromatsu | |
| 7,619,785 B2 * | 11/2009 | Sodeura | H04N 1/00002 |
| | | | 358/461 |
| 8,390,900 B2 * | 3/2013 | Sakane | H04N 1/00002 |
| | | | 358/461 |
| 8,525,800 B2 * | 9/2013 | Kao | G06F 3/0488 |
| | | | 345/173 |
| 9,769,347 B2 * | 9/2017 | Chen | H04N 1/04 |
| 2003/0072497 A1 | 4/2003 | Hiromatsu | |
| 2005/0206968 A1 * | 9/2005 | Sodeura | H04N 1/00002 |
| | | | 358/474 |
| 2008/0204782 A1 | 8/2008 | Hiromatsu | |
| 2008/0204820 A1 | 8/2008 | Ito | |
| 2010/0315687 A1 | 12/2010 | Sakane | |
| 2012/0069227 A1 * | 3/2012 | Hasuo | H04N 5/217 |
| | | | 348/243 |
| 2017/0054872 A1 * | 2/2017 | Fusayasu | H04N 1/19 |
| 2017/0094114 A1 * | 3/2017 | Inokuchi | H04N 1/401 |
| 2017/0134613 A1 * | 5/2017 | Matsubara | H04N 1/401 |
| 2017/0214827 A1 * | 7/2017 | Sasaki | H04N 1/00801 |

FOREIGN PATENT DOCUMENTS

| | | |
|---|---|---|
| JP | 06-197220 | 7/1994 |
| JP | 08-098017 | 4/1996 |
| JP | 10-327322 | 12/1998 |
| JP | 2003-198813 | 7/2003 |
| JP | 2010-288151 | 12/2010 |
| JP | 5007133 | 8/2012 |

* cited by examiner

IMAGE READING DEVICE GENERATING BLACK CORRECTION DATA FOR SHADE CORRECTION DETERMINED AT POSITIONS IN THE SUB-SCANNING DIRECTION BASED ON INTERMEDIATE DATA AND STORED REFERENCE BLACK CORRECTION DATA

BACKGROUND

1. Technical Field

The present disclosure relates to an image reading device that reads an image of an object.

2. Description of the Related Art

Unexamined Japanese Patent Publication No. 2010-288151 discloses an image reading device including a white reference plate. The image reading device acquires white reference data from an output of a sensor when a light source is turned on and an image of the white reference plate is acquired. In addition, the image reading device acquires black reference data from an output of the sensor with the light source turned off. The image reading device performs shading correction based on the thus acquired white reference data and black reference data.

Further, Unexamined Japanese Patent Publication No. H10-327322 discloses an image reading device that defines a white reference level in a sub-scanning direction as well as a main scanning direction. The image reading device corrects a white reference level in the main scanning direction using a correction value calculated from the white reference level in the sub-scanning direction.

SUMMARY

An image reading device of the present disclosure includes a sensor module, a data generator, a storage, and a corrector. The sensor module has a light source that irradiates an object and a plurality of sensors that reads light reflected from the object to acquire image signals. The data generator generates black correction data to be a black reference and white correction data to be a white reference that are to be used for shading correction. The storage stores reference black correction data to be black correction data that is to be used for the shading correction in a main scanning direction perpendicular to a predetermined sub-scanning direction in a predetermined first position in the sub-scanning direction. The corrector performs the shading correction on the image signals acquired by the plurality of sensors using the black correction data and the white correction data.

The plurality of sensors is disposed in the main scanning direction, and the image signals of the sensors constitute an image signal on a line extending in the main scanning direction.

The data generator acquires second intermediate data that is intermediate data which is lower in a density level than the black reference and higher in a density level than the white reference in each position in the sub-scanning direction based on an image signal of a second reference member extending in the sub-scanning direction in a predetermined second position of the main scanning direction. The data generator, then, generates black correction data in each positions in the sub-scanning direction based on the second intermediate data and the reference black correction data.

The corrector performs shading correction using the black correction data on each position in the sub-scanning direction so as to correct density unevenness of an image in the main scanning direction and the sub-scanning direction. Such density unevenness is caused by an interference between the image signals from the plurality of sensors.

With this configuration, the image reading device performs the shading correction using the correction data on each position in the sub-scanning direction. This configuration can reduce the density unevenness on the image in the main scanning direction and the sub-scanning direction caused by the interference between the image signals from the plurality of sensors.

DETAILED DESCRIPTION

Exemplary embodiments will be described in detail below with reference to the drawings appropriately. However, an unnecessarily detailed description will be omitted in some cases. For example, a detailed description of a well-known matter and duplicated description of substantially the same configuration will be omitted in some cases. This is to avoid the following description from being unnecessarily redundant and thus to help those skilled in the art to easily understand the description.

Note that the inventors of the present disclosure provide the accompanying drawings and the following description to help those skilled in the art to sufficiently understand the present disclosure, but do not intend to use the drawings or the description to limit the subject matters of the claims Background of the Disclosure In an image reading device such as a scanner that reads a document and then generates image data, a distortion is generated depending on positions of pixels. Such a distortion is caused by unevenness in light receiving elements of a sensor module such as a CCD (Charge Coupled Device) and a CIS (Contact Image Sensor), a difference in light converging performance between a central part and a peripheral part of a lens, and unevenness in a light amount distribution of a light source.

To eliminate this problem, an image reading device in which shading correction is performed on acquired image data is known. Further, there is known an image forming apparatus such as a multifunction peripheral and a copy machine including such an image reading device.

However, density unevenness is generated in an image in some cases in a configuration in which a plurality of sensors is disposed in a main scanning direction and in which the image signals constitute an image signal on a line extending in the main scanning direction. The density unevenness is caused by an interference between the outputs from the plurality of sensors. Such a density difference cannot be corrected sufficiently only by the above-described shading correction.

Particularly in a case of the image reading device with a wide reading region compatible with A3-size sheets, the density unevenness might be generated in an image not only in the main scanning direction but also in the sub-scanning direction. For this reason, an appropriate correction should be performed also in the sub-scanning direction.

In view of the above, in order to solve the issue as described above, the present disclosure provides an image reading device in which the density unevenness in the image in the main scanning direction and the sub-scanning direction due to the interference between the image signals from the plurality of sensors is reduced.

Exemplary embodiments are described in detail below with reference to the drawings.

First Exemplary Embodiment

[1. Configuration]

[1-1. Multifunction Peripheral]

Figure 1:
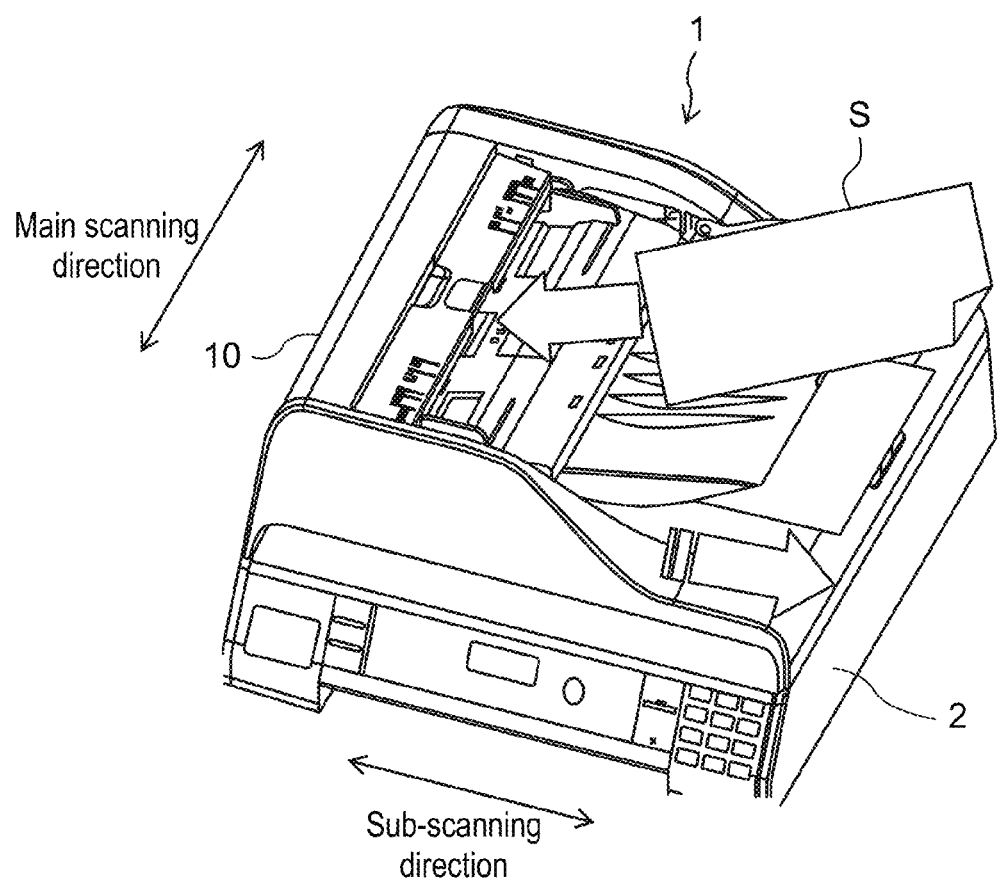
FIG. 1 is a perspective view of a multifunction peripheral in a first exemplary embodiment.
Figure 2:
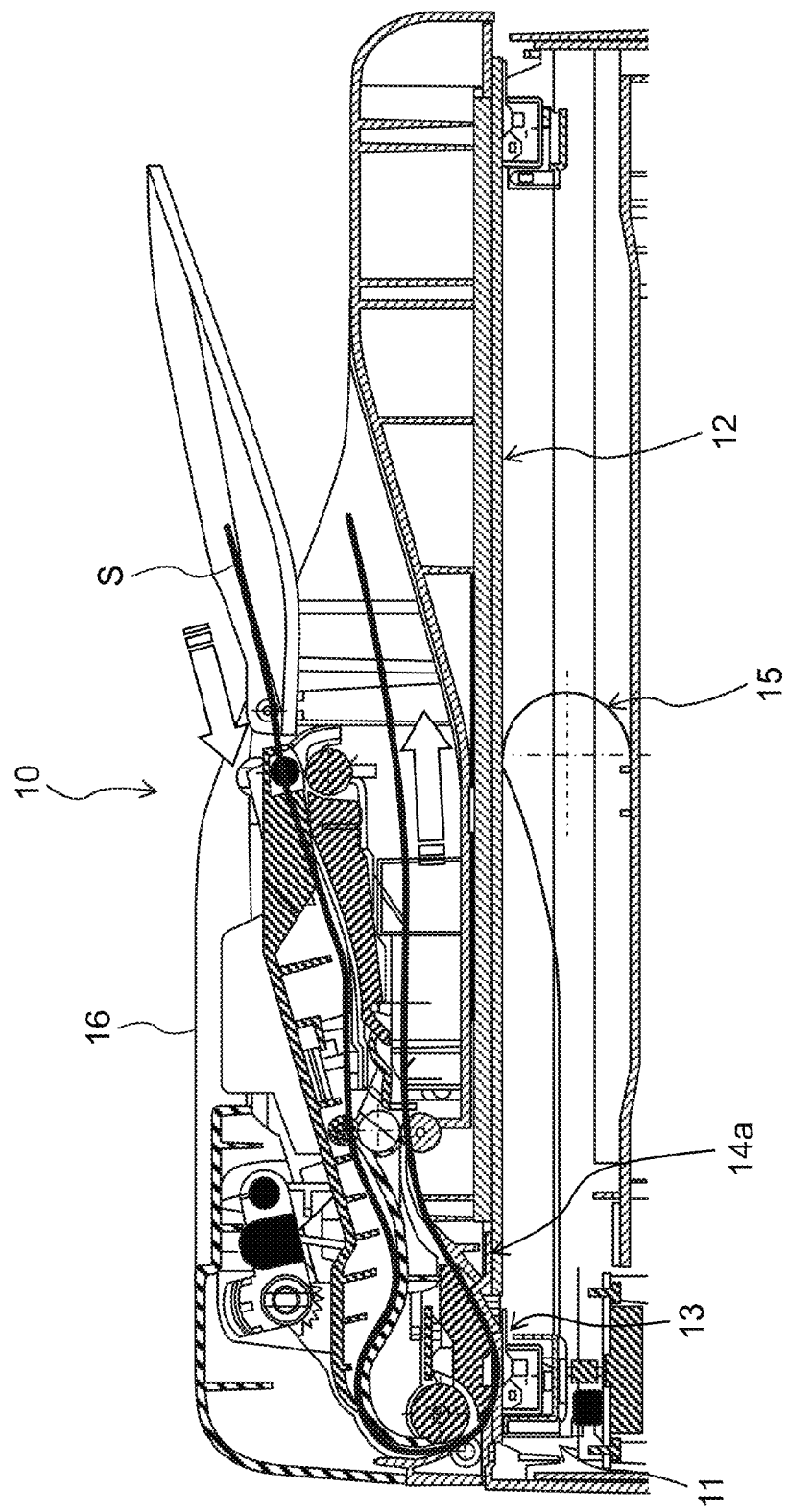
FIG. 2 is a sectional view of the multifunction peripheral.

A hardware configuration of multifunction peripheral 1 including image reading device 10 in a first exemplary embodiment is described with reference to FIGS. 1 and 2. FIG. 1 is a perspective view of the multifunction peripheral in the first exemplary embodiment. FIG. 2 is a sectional view of the multifunction peripheral in the first exemplary embodiment.

Multifunction peripheral 1 includes main unit 2 and image reading device 10 mounted on an upper part of main unit 2. Multifunction peripheral 1 has a scan function performed by image reading device 10, and in addition, other functions (for example, a print function, a copy function, a facsimile transmission/reception function, and the like). Main unit 2 has a configuration according to the function of multifunction peripheral 1.

Image reading device 10 is an FB (Flat Bed) type image scanner as shown in FIGS. 1 and 2. Image reading device 10 has scanner unit 11, FB glass 12, ADF (Auto Document Feeder) 16, ADF glass 13, first reference plate 14a, second reference plate 14b, and controller 100 (see FIG. 5).

FB glass 12 and ADF glass 13 are disposed on an upper surface of main unit 2. FB glass 12 occupies the most part of the upper surface of main unit 2. Document S is to be placed as a reading object on FB glass 12.

ADF glass 13 reads document S fed by ADF 16. ADF 16 feeds document S automatically.

ADF 16 is disposed on main unit 2 such that ADF 16 covers FB glass 12 and ADF glass 13.

Scanner unit 11 acquires an image of a reading object. Scanner unit 11 moves in main unit 2 along rear surfaces of FB glass 12 and ADF glass 13. The direction in which scanner unit 11 moves is referred to as a sub-scanning direction. FB glass 12 and ADF glass 13 are disposed in the sub-scanning direction.

Scanner unit 11 is driven by a motor (not shown) and moves in the sub-scanning direction along a guide (not shown). The motor is controlled by controller 100. Scanner unit 11 is connected to controller 100 through FFC (Flexible Flat Cable) 15. FFC 15 is a communication cable having signal lines therein. FFC 15 is long enough and flexible enough for scanner unit 11 to move smoothly within the movable range. Scanner unit 11 has sensor module 102 (see FIG. 3).

First reference plate 14a and second reference plate 14b are reference members for acquiring data for shading correction. First reference plate 14a is disposed on a position of the upper part of main unit 2 and between FB glass 12 and ADF glass 13. On the other hand, second reference plate 14b is disposed on the upper part of main unit 2 and on a side more outward than first reference plate 14a in the main scanning direction (see FIG. 4). First reference plate 14a and second reference plate 14b are disposed to face inside of main unit 2, in other words, to face scanner unit 11.

Figure 3:
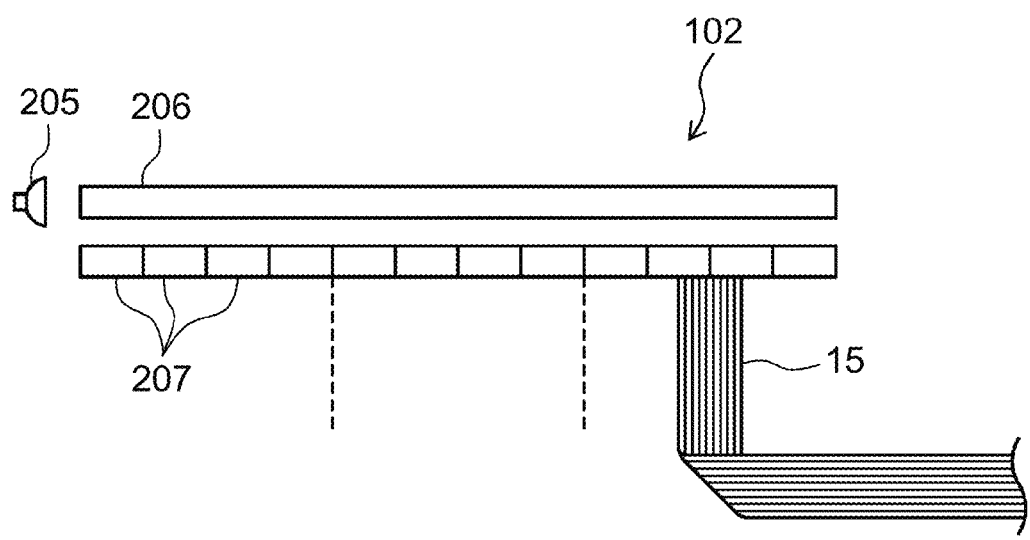
FIG. 3 is a schematic diagram of a sensor module.

FIG. 3 is a schematic diagram of sensor module 102 in the first exemplary embodiment. Sensor module 102 is of the contact image sensor type in the present exemplary embodiment, namely, the CIS type. Sensor module 102 has light source 205 and a plurality of sensors 207.

The plurality of sensors 207 is disposed in the main scanning direction perpendicular to the sub-scanning direction. Typically, sensors 207 are sensor ICs such as CMOS image sensors. One of sensors 207 includes a plurality of pixels (photoelectric convertors) arranged in the main scanning direction. A rod lens array (not shown) is provided above sensors 207. Light converged by the rod lens array enters sensors 207.

The plurality of sensors 207 is divided into a plurality of sectors. The received light is converted into image signals, and the converted image signals are output from each of the sectors. That is, the sector is a group of sensors 207 that output the image signals in a group. For example, when the number of sensors 207 is 12 and sensors 207 are divided into three sectors, each sector includes four sensors 207. Sensors 207 output the image signals to controller 100 through FFC 15.

Light source 205 is typically an LED (Light Emitting Diode). For example, light source 205 is made up of three LEDs of red (R), green (G), and blue (B). Light source 205 is disposed on one end (the left end in FIG. 3) of sensor module 102 in the main scanning direction. Sensor module 102 has light guide 206. The light from light source 205 is emitted upward through light guide 206, concretely speaking, toward FB glass 12, ADF glass 13, and first reference plate 14a or second reference plate 14b. Light source 205 and light guide 206 are disposed near sensors 207. Therefore, the light reflected from a document on FB glass 12 or ADF glass 13 or reflected from first reference plate 14a or second reference plate 14b enters sensors 207 through the rod lens array.

Figure 4:
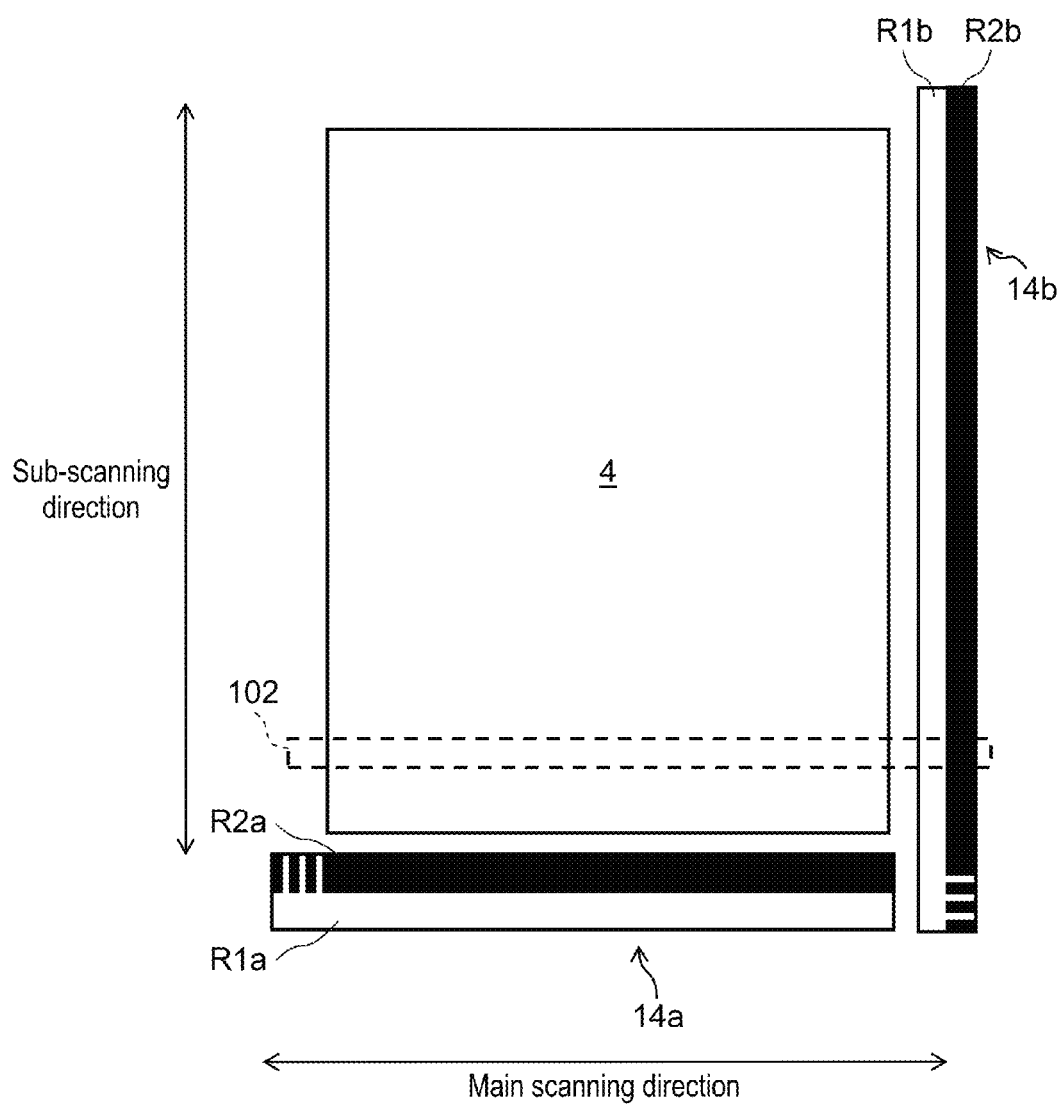
FIG. 4 is a diagram illustrating a disposition of a first reference plate and a second reference plate.

FIG. 4 is a diagram illustrating a disposition of first reference plate 14a and second reference plate 14b. First reference plate 14a extends in the main scanning direction, and is disposed on a side more outward than document placing region 4, where a document as a reading object is placed, in sub-scanning direction. First reference plate 14a has a length at least longer than document placing region 4 in main scanning direction. First reference plate 14a has white region R1a and black region R2a that extend in the main scanning direction at least on a surface facing sensor module 102. Light reflectance of white region R1*a* is substantially 100%. Further, first reference plate 14*a* is provided with a reference pattern indicating a home position on a side more outward than black region R2*a* in the main scanning direction. As the reference pattern, any pattern can be employed as long as image processor 204 can identify the pattern. For example, the reference pattern may be a plurality of black lines that are arranged in the main scanning direction and extend in the sub-scanning direction.

On the other hand, second reference plate 14*b* extends in sub-scanning direction, and is disposed in a position that is more outward than document placing region 4 in the main scanning direction and related to an end of sensor module 102 in the main scanning direction (more specifically, a position of sensor 207 located at an end of the main scanning direction). Sensor 207 related to the position of second reference plate 14*b* is disposed so as to acquire an image of second reference plate 14*b*. Second reference plate 14*b* is configured such that first reference plate 14*a* is rotated by 90° and is extended in the sub-scanning direction. Concretely, the length of second reference plate 14*b* in the sub-scanning direction is at least longer than a movable range of sensor module 102 in the sub-scanning direction, and a dimension in the main scanning direction is smaller than a reading width of related sensor 207. White region R1*b* and black region R2*b*, which spread over the movable range of sensor module 102 in the sub-scanning direction, are disposed on at least a surface of second reference plate 14*b* facing sensor module 102. Light reflectance of white region R1*b* is substantially 100%. First reference plate 14*a* and second reference plate 14*b* are examples of a first reference member and a second reference member. Further, the position of first reference plate 14*a* is an example of a first position, and the position of second reference plate 14*b* is an example of a second position.

[1-2. Image Reading Device]

Figure 5:
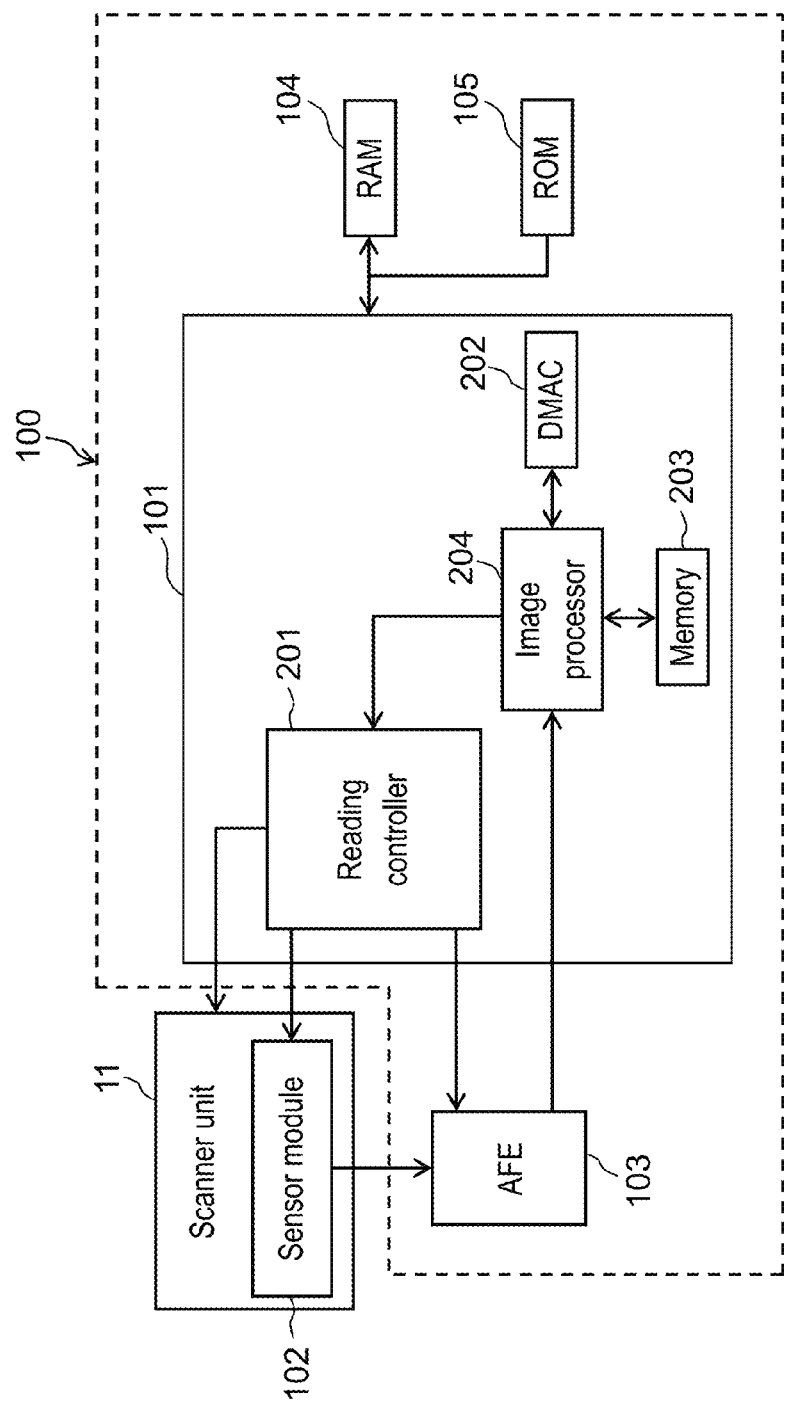
FIG. 5 is a block diagram of an image reading device.

FIG. 5 is a block diagram of image reading device 10 in the first exemplary embodiment. As shown in FIG. 5, image reading device 10 includes scanner unit 11 and controller 100.

Controller 100 controls an image reading operation of scanner unit 11 and performs image processing on the image signal being output from scanner unit 11. Controller 100 has CPU 101, AFE (Analog Front End Circuit) 103, RAM (Random Access Memory) 104, and ROM (Read Only Memory) 105.

The image signal (analog signal) is input to AFE 103 from sensor module 102 of scanner unit 11. AFE 103 has an analog-to-digital converter, an amplifier, and the like. AFE 103 amplifies the image signal from sensor module 102 through the amplifier, adds or subtracts an offset to or from the amplified image signal, converts the signal into a digital signal (image data) through the analog-to-digital converter, and outputs the digital signal to CPU 101.

RAM 104 stores the image data acquired by CPU 101. ROM 105 stores a predetermined program necessary to the image processing on CPU 101.

CPU 101 has reading controller 201, DMAC (Direct Memory Access Controller) 202, memory 203, and image processor 204.

Reading controller 201 controls operations of scanner unit 11 (including sensor module 102), ADF 16, and AFE 103. For example, reading controller 201 controls driving of the motor (not shown) for conveying document S set on ADF 16.

Image processor 204 performs the image processing on the image signal being input from AFE 103. Image processor 204 performs the image processing by reading out the program stored in ROM 105 and by executing the read-out program. Although a detailed description will be given later, image processor 204 performs various image processing such as a filtering process and shading correction. Image processor 204 is an example of the data generator and an example of the corrector.

DMAC 202 performs a data transfer process that transfers the image signal acquired by the image processing performed by image processor 204.

Memory 203 stores various data. For example, memory 203 stores the data to be used for the shading correction. Memory 203 is one example of a storage.

[1-3. Operations]

[1-3-1. Operation of Reading Device]

Figure 6:
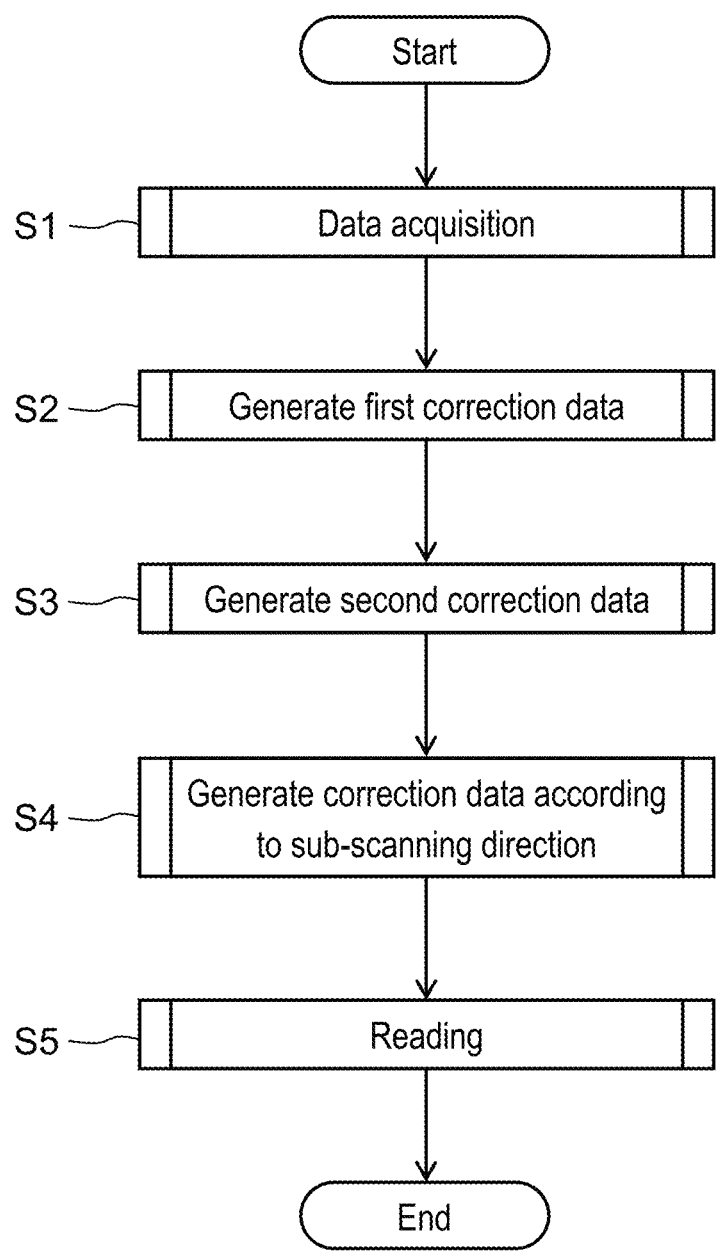
FIG. 6 is a flowchart of an image reading operation of the image reading device.

The image reading operation will be described. FIG. 6 is a flowchart of the image reading operation of image reading device 10.

The image reading operation starts when a power source of image reading device 10 is turned on and an operation of a user is then received. First, image processor 204 acquires data for generating first black correction data and first white correction data using first reference plate 14*a* and data for generating second black correction data and second white correction data using second reference plate 14*b* at step S1.

At step S2, image processor 204, then, generates the first black correction data that is reference black correction data to be used for the shading correction in the main scanning direction, and the first white correction data that is reference white correction data to be used for the shading correction in the main scanning direction based on the data acquired at step S1.

At step S3, image processor 204 generates the second black correction data and the second white correction data. Thereafter, at step S4, image processor 204 generates black correction data and white correction data according to positions in the sub-scanning direction based on the first black correction data, the first white correction data, the second black correction data, and the second white correction data generated at step S2.

After the generation of these correction data is completed, image processor 204 reads the document at step S5. At this time, image processor 204 performs the shading correction on the read-out image signal using the correction data according to each position in the sub-scanning direction. The first black correction data is an example of the reference black correction data, and the first white correction data is an example of the reference white correction data.

[1-3-2. Acquisition of Data]

Figure 7:
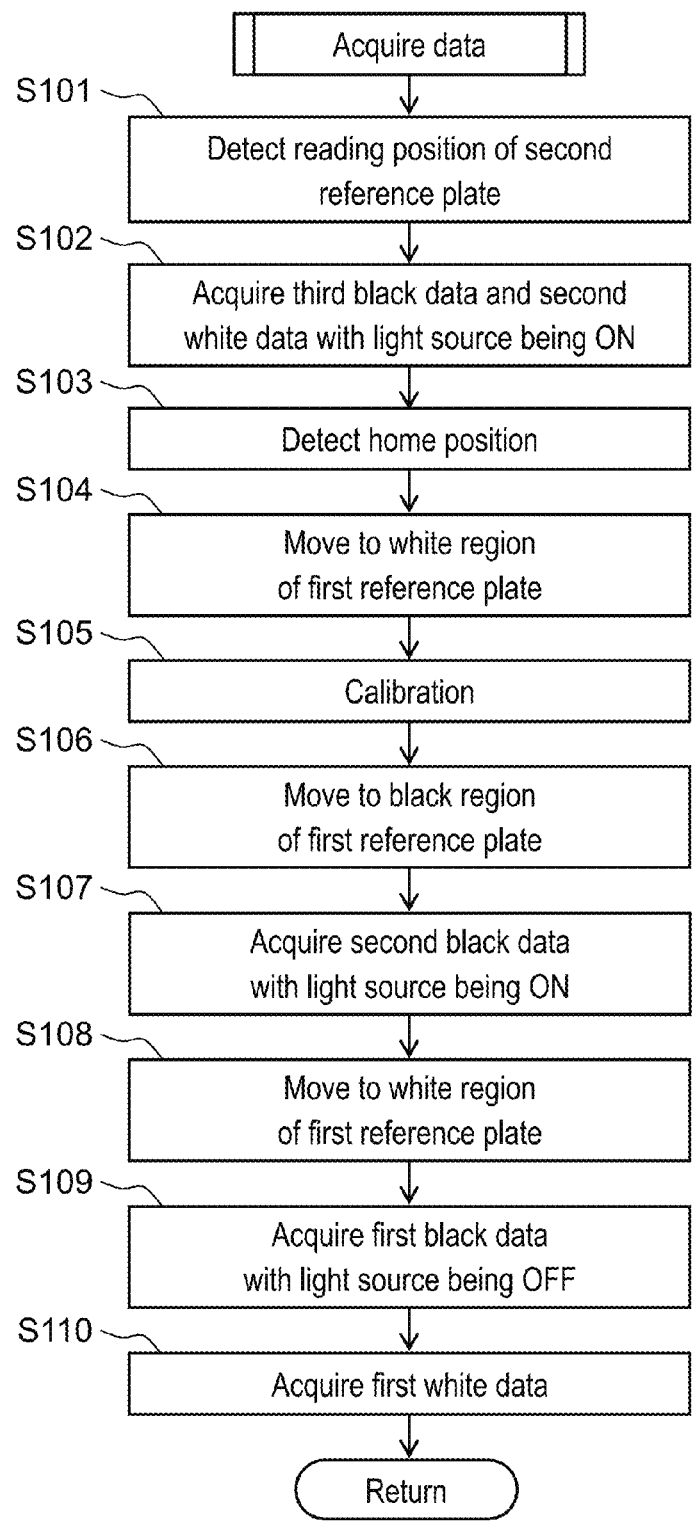
FIG. 7 is a flowchart of data acquisition of the image reading device.

FIG. 7 is a flowchart of data acquisition of image reading device 10 in the first exemplary embodiment.

The operation of data acquisition is started upon the operation for the data acquisition performed by the user through an operation unit (not shown) of image reading device 10.

At step S101, image processor 204 causes sensor module 102 to move to a reading position of second reference plate 14*b* through reading controller 201. At this time, the reading position may be detected by using the reference pattern provided to second reference plate 14*b*.

When the movement to the reading position is completed, image processor 204 makes light source 205 irradiate white region R1*b* and black region R2*b* of second reference plate 14*b*, and acquires images of white region R1*b* and black region R2*b* while causing sensor module 102 to move in the sub-scanning direction at step S102. That is, image processor 204 receives the light reflected from white region R1*b* and black region R2*b*, and converts the light into image signals. At this time, since the images are acquired while sensor module 102 is being moved in the sub-scanning direction, the image signals include a fluctuation in an output level with respect to the sub-scanning position. Further, since the light reflectance of white region R1*b* is substantially 100%, the image data based on the image signal of white region R1*b*, namely, the white data represents an output level of sensor 207 of white at a lowest density level in sub-scanning direction. Image processor 204 stores the white data as second white data in memory 203. Further, an object includes black region R2*b*, and sensor 207 receives also the light that is emitted from light source 205 and reflected from black region R2*b*. The image data based on the image signal of black region R2*b* at this time does not represent an output level of sensor 207 of a black color that is at a highest density level, but represents an output level of sensor 207 of a color close to black at a comparatively high density level in the sub-scanning direction. That is, the image data of black region R2*b* represents intermediate data that is lower in a density level than black at the highest density level and higher in a density level than white. Image processor 204 stores the intermediate data as third black data in memory 203. The third black data is an example of second intermediate data.

Image processor 204, then, detects a home position of sensor module 102 at step S103. Specifically, image processor 204 causes sensor module 102 to move to the home position stored in memory 203 through reading controller 201. This position is a temporary home position. Image processor 204, then, causes sensor module 102 to acquire an image at the home position and determines whether the reference pattern is detected from the acquired image. When the reference pattern is detected, the current position of sensor module 102 is precisely the home position. When the reference pattern is not detected, image processor 204 causes sensor module 102 to move toward one side in the sub-scanning direction to search for the reference pattern. When the reference pattern is detected, image processor 204 finishes detecting the home position. However, when the reference pattern is not detected even when sensor module 102 is moved toward the one side in the sub-scanning direction from the temporary home position by a certain distance, image processor 204 returns sensor module 102 back to the temporary home position and causes sensor module 102 to move toward the other side in the sub-scanning direction to search for the reference pattern. Image processor 204 continues to make sensor module 102 move toward the other side in the sub-scanning direction until the reference pattern is detected. Image processor 204 stores the detected position of the home position in memory 203, and at the next detection of the home position, image processor 204 uses the home position, which is stored in memory 203, as the temporary home position.

When the movement to the home position is completed, at step S104, image processor 204 causes sensor module 102 to move to the position facing white region R1*a* of first reference plate 14*a* through reading controller 201.

Image processor 204, then, performs calibration at step S105. For example, image processor 204 performs initial setting such as the setting of a lighting time of light source 205 and the setting of AFE 103. Output levels of the image signals being output from sensors 207 can be equalized by setting the lighting time of light source 205.

When the calibration is completed, at step S106, image processor 204 causes sensor module 102 to move to the position facing black region R2*a* of first reference plate 14*a* through reading controller 201 based on the home position detected at step S104.

At step S107, image processor 204 irradiates black region R2*a* with light source 205 (the light source is ON), and acquires the image of black region R2*a*. At this time, since each sensor 207 disposed in the main scanning direction receives the light, this image data represents the fluctuation of output level in the main scanning direction. Further, although the object is black, sensor 207 receives the light that is emitted from light source 205 and reflected from black region R2*a*. For this reason, the image data at this time does not represent an output level of sensor 207 of a black color that is at a highest density level, but represents an output level of sensor 207 of a color close to black at a comparatively high density level in the main scanning direction. That is, the image data of black region R2*a* represents intermediate data that is lower in a density level than black at the highest density level and higher in a density level than white. Image processor 204 stores this image data as second black data in memory 203. The second black data is an example of first intermediate data in the main scanning direction.

When acquisition of the second black data is completed, at step S108, image processor 204 causes sensor module 102 to move to the position facing white region R1*a* of first reference plate 14*a* through reading controller 201.

At step S109, image processor 204, then, acquires the image with light source 205 turned off (the light source being OFF). Since light source 205 is off, at least the light from light source 205 (namely, the light emitted from light source 205 and reflected by the object) does not enter sensors 207. Therefore, the image data at this time represents the output level of sensors 207 of black that is at the highest density level. The image data is so-called black data. Image processor 204 stores the image data as first black data in memory 203. The first black data is an example of the black data.

Image processor 204, then, turns on light source 205 so as to acquire an image at step S110. At this time, since sensor module 102 faces white region R1*a* of first reference plate 14*a*, sensor module 102 acquires the image of white region R1*a*. Since the reflectance of white region R1*a* is substantially 100%, the image data at this time, namely, the white data represents an output level of sensor 207 of white at the lowest density level in the main scanning direction. Image processor 204 stores the white data as first white data in memory 203.

[1-3.3. Generation of Correction Data in Main Scanning Direction]

Generation of correction data in the main scanning direction will be described.

In generation of correction data in the main scanning direction, the first black correction data that is a black reference of the shading correction in the main scanning direction is generated based on the first black data and the second black data acquired in the data acquisition process. An influence of density unevenness in the main scanning direction caused by crosstalk to be described in detail later can be reduced by generating the first black correction data using the first black data and the second black data.

Specifically, a noise is occasionally generated on the image signals when the image signals from the plurality of sensors 207 interfere with each other on transmission path of the image signals (crosstalk). In particular, in the configuration in which the image signals are output through FFC 15 as in the case of sensors 207, crosstalk is likely to be generated due to bending of FFC 15.

Figure 8:
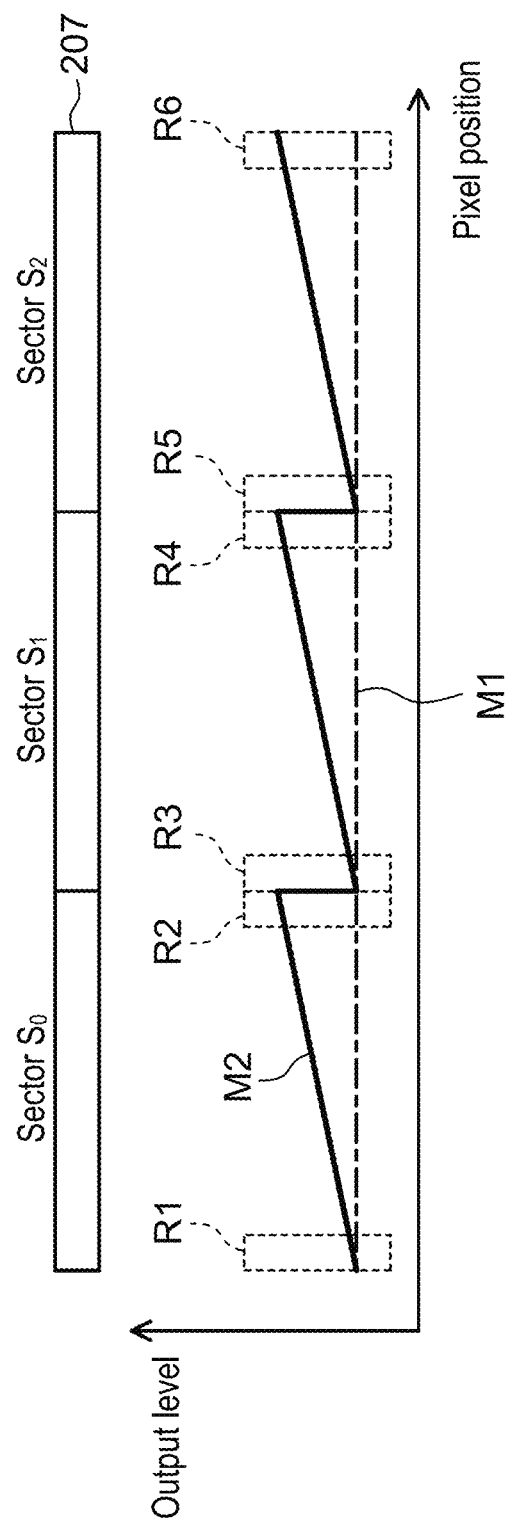
FIG. 8 is a diagram illustrating an example of an output level of a sensor.

FIG. 8 is a diagram illustrating an example of an output level of sensor 207. In FIG. 8, alternate long and short dash line M1 represents the case where no crosstalk occurs, and solid line M2 represents the case where crosstalk occurs. The vertical axis in FIG. 8 represents the output level of sensors 207, and the horizontal axis represents the position of the pixels of the sensor 207 in the main scanning direction. For example, when an object with uniform reflectance is imaged and no crosstalk occurs, the output levels of the pixels are substantially constant as represented by alternate long and short dash line M1 in FIG. 8 if the pixels are assumed to have no individual differences between pixels. However, when crosstalk occurs, the output levels of the pixels change in each sector as represented by solid line M2 in FIG. 8. For example, as shown in FIG. 8, the output levels of the pixels in each sector increase linearly from one end toward the other end of the sector. Further, when the output levels of the pixels are different in each sector, a step is generated between the output levels at the part at which the sectors change.

Figure 9:
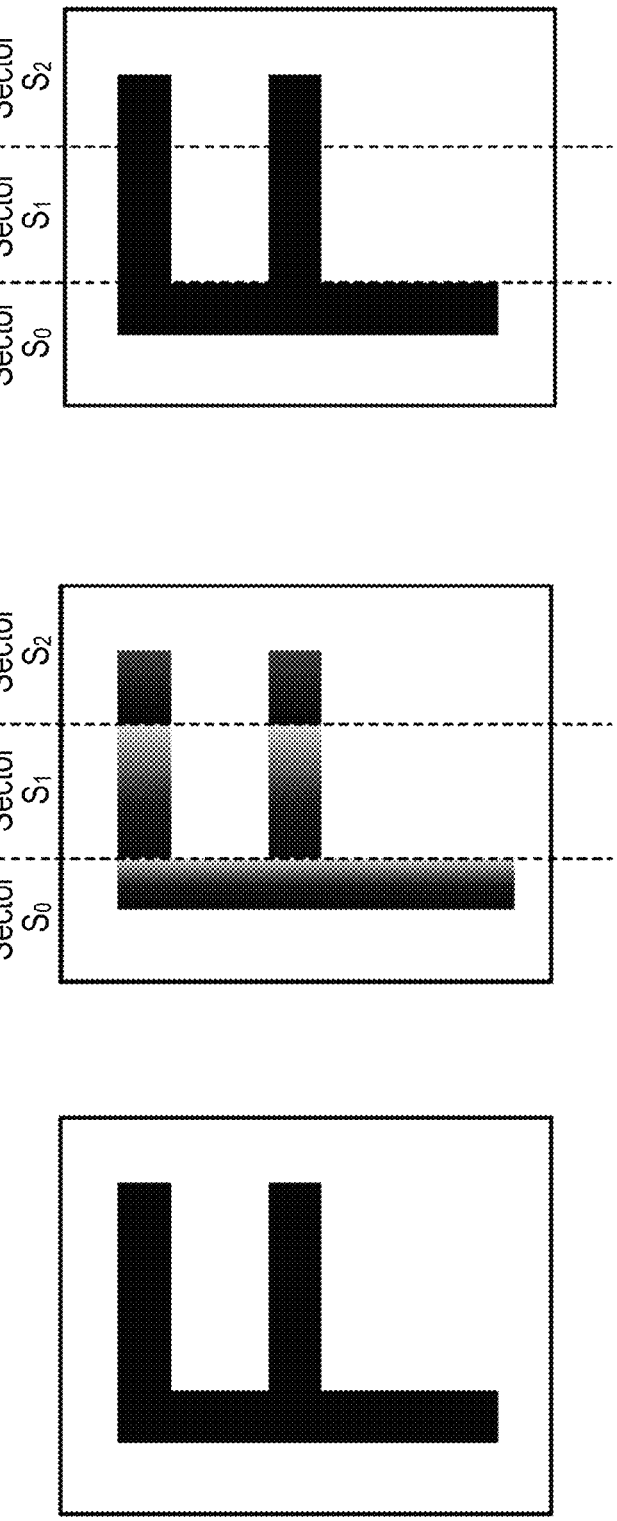
FIG. 9A is a diagram illustrating an image of a document.
FIG. 9B is a diagram illustrating a read image on which conventional shading correction has been performed.
FIG. 9C is a diagram illustrating a read image on which conventional shading correction has been performed.

FIG. 9A is a diagram illustrating an image of a document. FIG. 9B is a diagram illustrating a read image on which conventional shading correction has been performed. FIG. 9C is a diagram illustrating a read image on which the shading correction has been performed.

FIG. 9A illustrates an example of the image of document S. FIG. 9B illustrates a read image on which conventional shading correction has been performed after the image of document S has been read. As shown in FIG. 9B, when a noise is generated due to crosstalk, a density unevenness is generated in the read image. In the read image of FIG. 9B, density unevenness is generated at the part corresponding to the boundary between the sectors of sensors 207.

Figure 10:
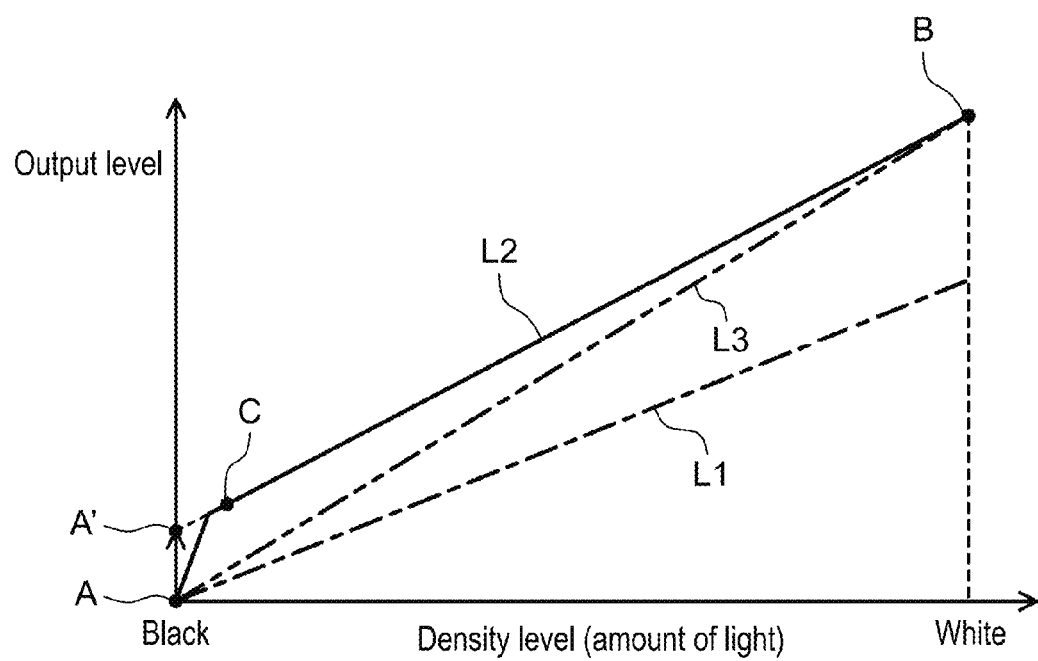
FIG. 10 is a graph illustrating a relationship of an output level of the sensor with respect to a density level.

Further, FIG. 10 is a graph illustrating a relationship of the output level of sensor 207 with respect the density level. Each pixel of sensor 207 outputs a voltage signal corresponding to an amount of light. A change in the voltage corresponding to the amount of light depends on characteristics of sensor 207. For example, when the voltage changes linearly depending on the amount of light, the voltage ideally changes as shown by alternate long and short dash line L1. However, when the noise caused by crosstalk (hereinafter, referred to as an "interference noise") is superposed on the output signal, the voltage changes as shown by solid line L2. That is, since the output level of black at the highest density level is low, an interference noise hardly appears on the output signal. However, when the density level becomes a bit lower than the black, the output level of sensor 207 increases, and the interference noise increases accordingly.

In conventional typical shading correction, image data is acquired with light source 205 turned off (point A), and the image data is used as the black correction data to be the black reference. The image data of white is acquired when light source 205 is on (point B), and the image data is used as the white correction data to be the white reference. An offset and a gain (dynamic range) of each pixel is corrected by performing the shading correction using the thus acquired black correction data and white correction data. However, an interference noise is not likely to affect the image signal acquired while light source 205 is off. For this reason, when the shading correction is performed by using the image data at point A and point B, the shading correction is performed based on the characteristics shown by alternate long and two short dashes line L3 different from the actual output characteristics of sensor 207, thus, the shading correction cannot be appropriately performed.

Therefore, image reading device 10 of the present disclosure generates the first black correction data using the first black data acquired while light source 205 is off and the second black data acquired while light source 205 is on.

Figure 11:
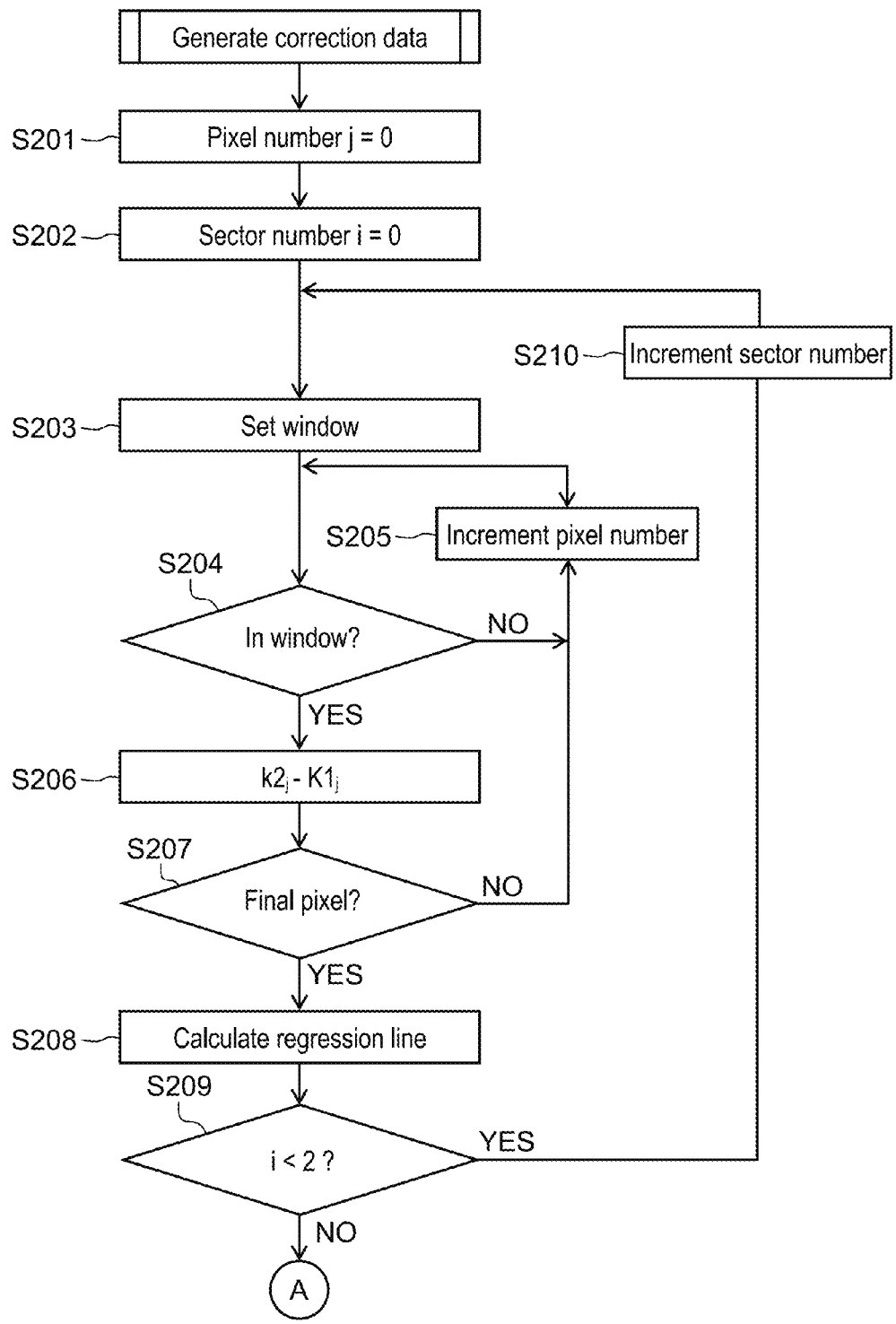
FIG. 11 is a flowchart of a front stage of a first black correction data generation process.
Figure 12:
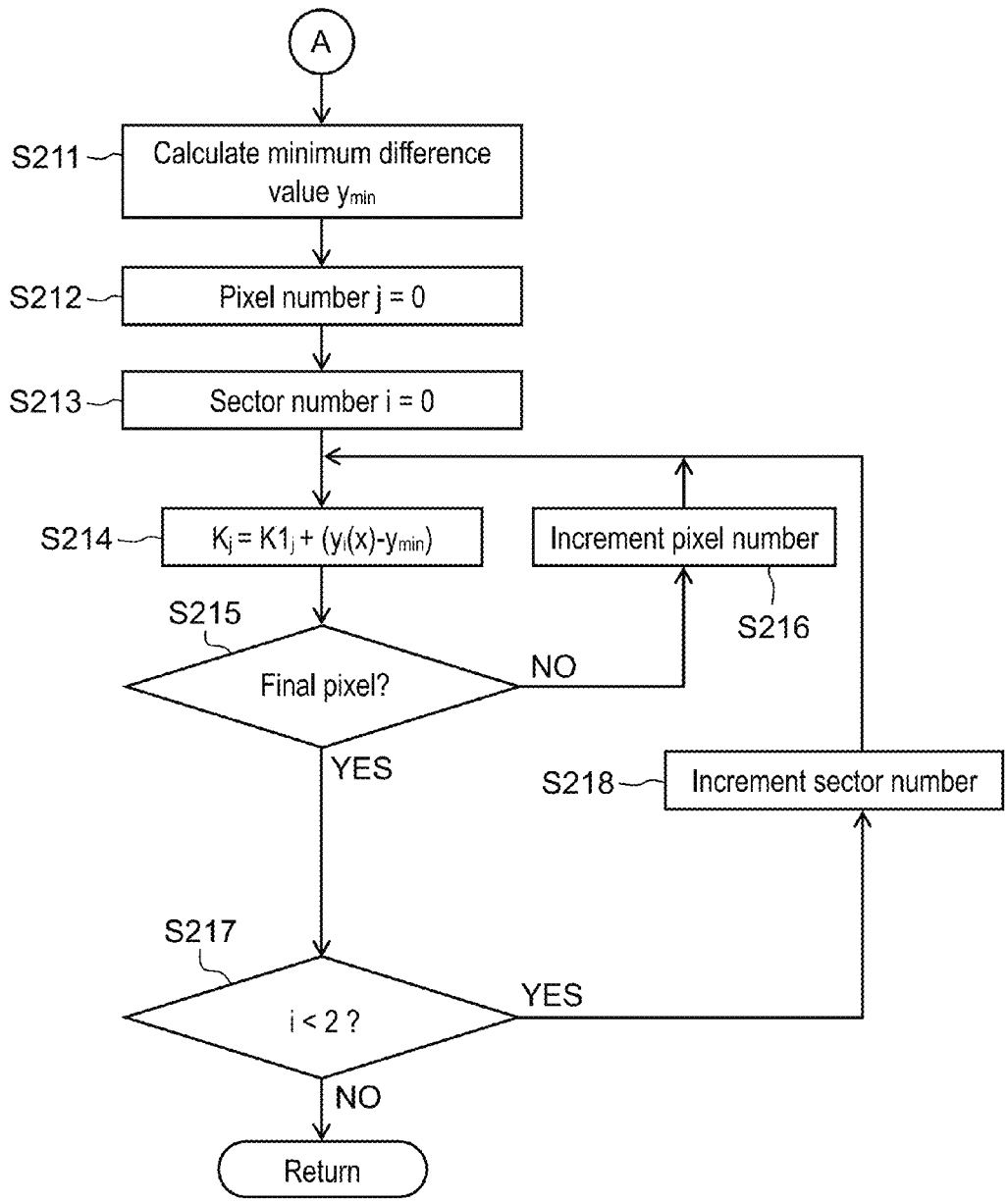
FIG. 12 is a flowchart of a rear stage of the first black correction data generation process.

FIG. 11 is a flowchart of a front stage of a first black correction data generation process of image reading device 10 in the first exemplary embodiment. FIG. 12 is a flowchart of a rear stage of the first black correction data generation process of image reading device 10 in the first exemplary embodiment.

In the following description, the number of sectors of sensor 207 is 3, and the number of pixels in the main scanning directions is n. Further, the sector is represented by $S_i$ (i=0 to 2), and the pixel is represented by $X_j$ (j=0 to n−1). Sector $S_0$ is located on one end of sensor 207 in the main scanning direction, sector $S_1$ is next to sector $S_0$, and sector $S_2$ is next to sector $S_1$ and is located on the other end of sensor 207 in the main scanning direction. As for the pixels, pixel $X_0$ is on one end of sensor 207 in the main scanning direction, and the pixel having a larger pixel number j is closer to the other end in the main scanning direction, where pixel $X_{n-1}$ is on the other end of sensor 207 in the main scanning direction.

At step S201, image processor 204 sets the pixel number j to 0. Further, at step S202, image processor 204 sets sector number i to 0.

Next, at step S203, image processor 204 sets an area (a window) in which difference values to be described later are calculated in the respective sectors. In detail, as shown in FIG. 8, windows are set at one end and at the other end, in each sector, in the main scanning direction. A width of each window is set to include a predetermined number of pixels. In FIG. 8, in sector $S_0$, start window R1 and end window R2 are respectively set at one end and at the other end in the main scanning direction. Similarly, in sector $S_1$, start window R3 and end window R4 are respectively set at one end and at the other end in the main scanning direction. Further, in sector $S_2$, start window R5 and end window R6 are respectively set at one end and at the other end in the main scanning direction.

At step S204, image processor 204 determines whether pixel $X_j$ is included in the window. For example, since the equation is j=0 just after step S201, pixel $X_j$ is included in start window R1 of sector $S_0$.

When the pixel $X_j$ is outside the window, image processor 204 increments the pixel number j at step S205 and performs the process of step S204 again. That is, image processor 204 determines whether the next pixel $X_j$ is included in the window.

On the other hand, when pixel $X_j$ is in the window, image processor 204 calculates a difference value ($K2_j - K1_j$) between an output level $K2_j$ of pixel $X_j$ of the second black data and an output level $K1_j$ of pixel $X_j$ of the first black data at step S206, and stores the calculated difference value in memory 203.

After that, image processor 204 determines whether pixel $X_j$ is the final pixel in sector $S_i$ at step S207. When pixel $X_j$ is not the final pixel, image processor 204 increments the pixel number j, and performs the process of step S204 again at step S205.

Figure 13:
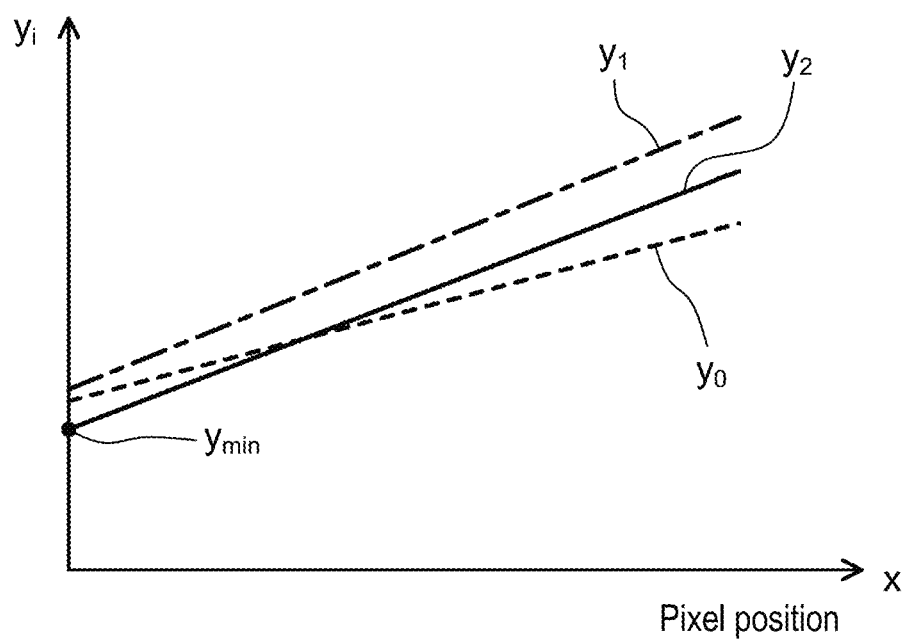
FIG. 13 is a graph illustrating a regression line of a difference value in each sector.

On the other hand, when pixel $X_j$ is the final pixel, image processor 204 calculates a regression line of the difference values in sector $S_i$ at step S208. Specifically, as shown in FIG. 13, image processor 204 calculates a regression line $y_i(x)=a_i \times x + b_i$ of the difference value of the pixel included in the start window in sector $S_i$ and the difference value of the pixel included in the end window, where x is the pixel position in the sector, $y_i$ is the difference value, i is a sector number, $a_i$ is the coefficient (inclination) of the regression line, $b_i$ is the coefficient (constant term) of the regression line. Image processor 204 stores the calculated coefficients $a_i$, $b_i$ of the regression line in memory 203.

FIG. 13 is a graph illustrating a regression line of difference values in each sector. In FIG. 13, dotted line $y_0$ represents the regression line in sector $S_0$, solid line $y_2$ represents the regression line in sector $S_1$, and alternate long and short dash line $y_3$ represents the regression line in sector $S_2$.

Image processor 204, then, determines at step S209, whether the sector number i is smaller than "2". When the sector number i is smaller than "2", image processor 204 increments, at step S210, the sector number i, and performs the process of step S203 again. That is, unless sector $S_i$ in which the regression line has been calculated is the final sector (that is, sector $S_2$), image processor 204 changes sector $S_i$ to the next sector $S_{i+1}$ and repeats the calculation of the regression line.

On the other hand, when the sector number i is "2" or more, namely, when the sector number is 2, image processor 204 finishes the front stage of generating the first black correction data.

Subsequently, image processor 204 performs the process of the rear stage of generating the correction data. In detail, as shown in FIG. 13, image processor 204 obtains, at step 5211, the minimum difference value $y_{min}$ ($y_{min}=\min(y_i)$) in the three regression lines y0 to y2, stored in memory 203, of sector $S_0$, sector $S_1$, and sector $S_2$. That is, the minimum difference value $y_{min}$ is the smallest minimum value, of the minimum values in the regression line of each sector, in the three sectors.

Image processor 204, then, sets the pixel number j to 0 at step 5212. Subsequently, image processor 204 sets, the sector number i to 0 at step 5213.

Image processor 204, then, corrects the output level $K1_j$ of pixel $X_j$ of the first black data by using the minimum difference value $y_{min}$, and thus obtains the black correction data at step S214. Specifically, the correction value $K_j$ for pixel $X_j$ of the black correction data is expressed by the following equation.

$$K_j = K1_j + (y_i(x) - y_{min})$$

Image processor 204, then, determines whether pixel $X_j$ is the final pixel in sector $S_i$ at step S215. When pixel $X_j$ is not the final pixel, image processor 204 increments the pixel number j, and performs the process of step S214 again at step S216.

On the other hand, at step S217, when pixel $X_j$ is the final pixel, image processor 204 determines at step S217 whether the sector number i is smaller than "2". When the sector number i is smaller than "2", at step S218, image processor 204 increments the sector number i, and performs the process of step S214 again. That is, unless sector $S_i$ in which the black correction data have been calculated is the final sector (namely, sector $S_2$), image processor 204 changes sector $S_i$ to the next sector $S_{i+1}$ and repeats the calculation of the first black correction data.

On the other hand, when the sector number i is "2" or more, namely, when the sector number is 2, image processor 204 finishes the rear stage of generating the correction data.

As described above, image processor 204 calculates the correction value $K_j$ of the first black correction data in the main scanning direction by adding the value obtained by subtracting the minimum difference value $y_{min}$ from the difference value $y_i(x)$ in each sector to the output level $K1_j$ of the first black data.

[1-3-4. Generation of Correction Data according to Each Position in Sub-Scanning Direction]

Generation of the black correction data and the white correction data according to each position in the sub-scanning direction is described.

In the configuration in which the image signals are output through FFC 15, crosstalk is likely to be generated due to bending of FFC 15. As shown in FIG. 2, when sensor module 102 is located around a reading start position, most part of FFC 15 is overlapped. As sensor module 102 moves from the reading start position along the sub-scanning direction, the overlapped portion of FFC15 reduces more. When sensor module 102 is located near the reading end position, FFC15 almost fully stretches, and thus the overlapped portion is small. When such overlapping of FFC 15 fluctuates, a volume of the interference noise caused by bending of FFC 15 also fluctuates.

Figure 14:
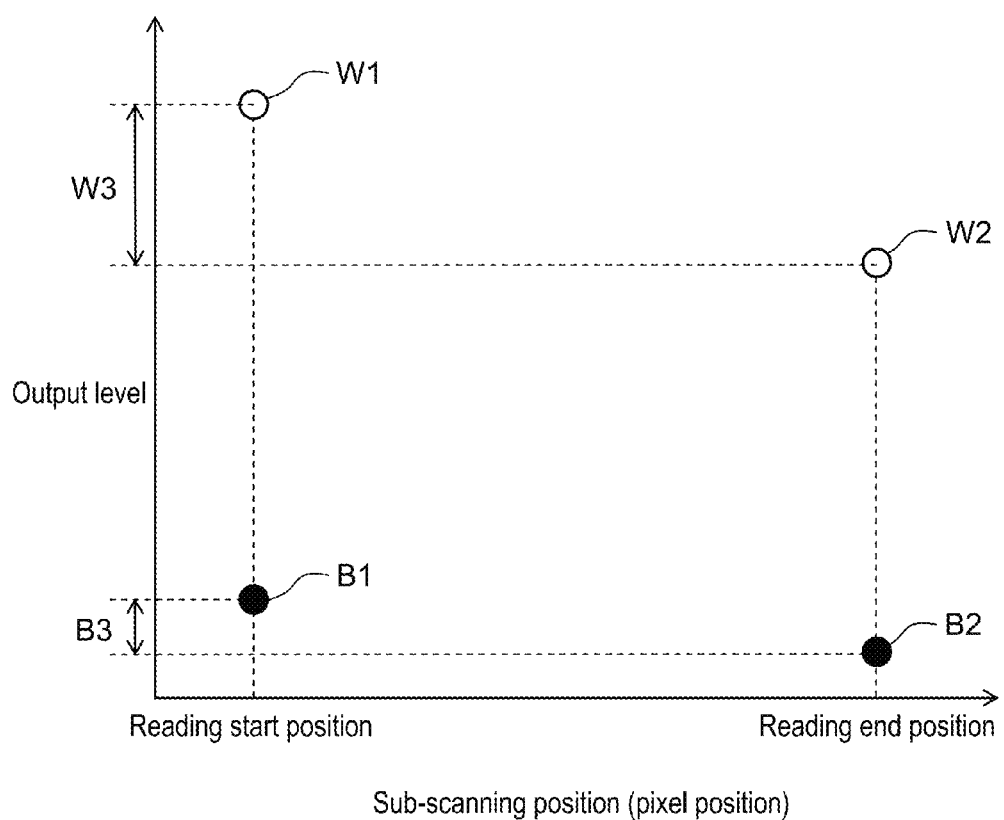
FIG. 14 is a graph illustrating a relationship of an output level of a sensor with respect to a sub-scanning position.

FIG. 14 is a graph illustrating an output level of sensor 207 with respect to a typical sub-scanning position. Filled circles in FIG. 14 represent an output level of black, and white circles represent an output levels of white. B1 represents the output level of black acquired in the reading start position, and B2 represents the output level of black acquired in the reading end position. Further, W1 represents the output level of white acquired in the reading start position, and W2 represents the output level of white acquired in the reading end position.

The output levels of the image signals acquired in each position include interference noises. However since the overlapping state of FFC 15 varies in each position, the volume of the interference noise varies. For this reason, the output level fluctuates according to a position in the sub-scanning direction. At this time, since the interference noise included in the output level of white is great, an influence due to the fluctuation in the interference noise becomes great. That is, the output level of white fluctuates more greatly than the output level of black. As a result, a difference between the output level of white and the output level of black fluctuates in the reading start position and the reading end position. In a case of FIG. 14, it is found that the difference W3 between white levels W1 and W2 is larger than the difference B3 between the black levels B1 and B2.

For this reason, when the shading correction is performed on the image data in the reading end position by using the correction data in the reading start position, gradation does not match between the correction data and the image data, and thus density unevenness of the image shown in FIG. 9B is generated also in the sub-scanning direction.

Therefore, in image reading device 10 of the present disclosure, the second black correction data and the second white correction data that represent the correction values for generating the correction data according to the position in the sub-scanning direction are calculated based on the first black correction data and the first white correction data. The black correction data according to each position in the sub-scanning direction is acquired by using the first black correction data and the second black correction data. The white correction data according to each position in the sub-scanning direction is acquired by using the first white correction data and the second white correction data. The shading correction is performed according to each position in the sub-scanning direction. FIG. 14 illustrates a case where the output level in the reading end position becomes lower than the output level in the reading start position. However, the output level in the reading end position occasionally becomes higher than the output level in the reading start position due to a constitution, an environment variable or the like of the device. Further, the output level from the reading start position to the reading end position might change linearly or non-linearly. Further, a discontinuous change occasionally appears.

In the following description, the number of pixels in the sub-scanning direction is m, and the pixels are represented by $X_1$ (1=0~m−1). As for the pixels, pixel $X_0$ is on one end of sensor 207 in the sub-scanning direction, and the pixel having a larger pixel number 1 is closer to the other end in the sub-scanning direction, where pixel $X_{m-1}$ is on the other end of sensor 207 in the sub-scanning direction. For example, at this time pixel $X_0$ corresponds to the pixel of second reference plate 14b in the reading start position, and pixel $X_{m-1}$ corresponds to the pixel of second reference plate 14b in the reading end position in the sub-scanning direction.

In order to generate the second black correction data, image processor 204 obtains a difference value between the output level on pixel $X_0$ of the third black data that is represented by $K_{30}$ and the output level on pixel $X_1$ of the third black data that is represented by $K_{31}$.

$$CK_1 = K_{31} - K_{30}$$

On the other hand, as for the second white correction data, the output level on pixel $X_0$ of the second white data is represented by $S_{20}$, and the output level on pixel $X_1$ of the second white data is represented by $S_{21}$, and a difference value between these output levels is obtained.

$$CS_1 = S_{21} - S_{20}$$

Image processor 204 stores $CK_1$ as the second black correction data and $CS_1$ as the second white correction data in memory 203.

When the generation of the second black correction data and the second white correction data is completed, at step S4 shown in the flow of FIG. 6, image processor 204 adds $CK_1$ to the first black correction data, so that the black correction data is acquired according to each position in the sub-scanning direction.

On the other hand, $CS_1$ is added to the first white correction data, so that the white correction data is acquired according to each position in sub-scanning direction.

[1-3-5. Reading Process]

The black correction data and the white correction data are acquired according to each position in the sub-scanning direction. Image processor 204 performs the reading process. Specifically, image processor 204 causes sensor module 102 to move and perform the reading process of the image of document S through reading controller 201. Image processor 204 performs the shading correction on the read image using the black correction data and the white correction data.

The shading correction in the main scanning direction is performed with respect to each position in the sub-scanning direction by using the black correction data according to each position in the sub-scanning direction and the white correction data according to each position in the sub-scanning direction. As a result, the influence of the density unevenness of the image in the main scanning direction and the sub-scanning direction caused by crosstalk can be reduced.

Specifically, since the first black data acquired at step S109 has a very small output level itself, the interference noise included in the first black data is also very small (see point A in FIG. 10). On the other hand, since the second black data is on the side lower in a density level than the first black data and the output level is large, an interference noise appears on the second black data (see point C in FIG. 10). The first black data is corrected by using the second black data, so that the black correction data containing an interference noise in the position of first reference plate 14a can be generated.

Since the second black data is an image signal of black region R2a of first reference plate 14a although light source 205 is on, an output caused by the reflection light from black region R2a is minimal in the outputs of the second black data, and most part of the output is an interference noise. Further, since the density of black region R2a irradiated with light is extremely close to black, an output caused by the reflection light from black region R2a is slightly larger than an output of the first black data but is rarely different. Therefore, the difference value $(K2_j - K1_j)$ between the output level of the second black data and the output level of the first black data can be regarded as approximately the interference noise in the position of first reference plate 14a. In the present disclosure, the difference value $(K2_j - K1_j)$ is linear-regressed, and the offset of the difference value $(K2_j - K1_j)$ in each sector is corrected, however, in principle, the black correction data containing the interference noise in the position of first reference plate 14a is generated by adding the difference value $(K2_j - K1_j)$ to the first black data. That is to say, the data at point A' in FIG. 10 is generated.

Further, since the third black data is an image signal of black region R2b of second reference plate 14b although light source 205 is on, most part of the output is an interference noise similarly to the second black data. Further, even when the third black data includes the output level of sensor 207 of black at the highest density level besides the interference noise, the output level does not fluctuate depending on the positions in the sub-scanning direction. That is, a difference value $(K_{31} - K_{30})$ between the output level on pixel $X_0$ in the reading start position of the third black data and the output level on pixel $X_1$ in any position in the sub-scanning direction, namely, an output of a black image itself is deleted from the second black correction data, and the second black correction data represents only a difference of the interference noises. Much the same is true also on the second white correction data, and a difference value $(S_{21} - S_{20})$ between the output level on pixel $X_0$ in the reading start position of the second white data and the output level in the position of pixel $X_1$ represents a difference between noises in the sub-scanning direction. For this reason, the second correction data are added to the first black correction data and the first white correction data so that the black correction data and the white correction data where a fluctuation in the noise in the sub-scanning direction is taken into consideration can be generated.

The shading correction is performed by using the black correction data (point A' in FIG. 10), which contains the interference noise and where a fluctuation of the interference noise in the sub-scanning direction is taken into consideration, and the white correction data (point B in FIG. 10), where a fluctuation of the interference noise in the sub-scanning direction is taken into consideration. As a result, the shading correction can be performed according to the actual output from sensor 207 containing the interference noises in both the main scanning direction and the sub-scanning direction.

When image processor 204 successively reads images of a plurality of documents S, the third black data and the second white data are acquired once by using second reference plate 14b before the sequential reading of the images of the plurality of documents S is started. The first black data, the second black data, and the first white data are acquired every time before reading an image of each document S. The shading correction of the image data of each document S is performed after the black correction data and the white correction data associated with each position in the sub-scanning direction are generated based on the third black data and the second white data once acquired before the entire reading, and the first black data, the second black data and the first white data acquired every time before each reading.

[1-4. Conclusion]

Image reading device 10 includes sensor module 102, image processor 204, and memory 203. Sensor module 102 has light source 205 that irradiates an object and a plurality of sensors 207 that reads light reflected from the object to acquire image signals. Image processor 204 generates black correction data to be a black reference and white correction data to be a white reference that are to be used for shading correction, and performs the shading correction on the image signals acquired by the plurality of sensors 207 using the black correction data and the white correction data. Memory 203 stores first black correction data to be black correction data that is to be used for the shading correction in the main scanning direction perpendicular to the predetermined sub-scanning direction in a predetermined first position in the sub-scanning direction.

The plurality of sensors 207 is disposed in the main scanning direction, and the image signals of the sensors constitute an image signal on a line extending in the main scanning direction.

Image processor 204 acquires the third black data as the intermediate data which is lower in a density level than the black reference and higher in a density level than the white reference in each position in the sub-scanning direction based on the image signal of second reference plate 14b extending in the sub-scanning direction in a predetermined second position of the main scanning direction. Image processor 204, then, generates black correction data in each position in the sub-scanning direction based on the third black data and the first black correction data. Image processor 204, then, performs the shading correction using the black correction data in each position in the sub-scanning direction so as to correct density unevenness of an image in the main scanning direction and the sub-scanning direction. Such density unevenness is caused by an interference between the image signals from the plurality of sensors 207.

In this configuration, the third black data as the second intermediate data is acquired based on the image signal of second reference plate 14b, and the second black correction data to be a correction value for generating the black correction data in each position in the sub-scanning direction is generated based on the third black data. As a result, a black correction value including a fluctuation in an interference noise in the sub-scanning direction can be obtained.

The black correction data according to each position in the sub-scanning direction can be calculated by using the first black correction data and the second black correction data. The shading correction is performed by using the black correction data formed in such a manner so that the density unevenness of the image in the main scanning direction and the sub-scanning direction, which is caused by an interference noise, can be corrected.

Image processor 204 acquires the second black data that is the intermediate data in each position in the main scanning direction in the first position based on the image signal of first reference plate 14a extending in the main scanning direction in the first position, and generates the first black correction data based on the second black data.

In this configuration, the second black data as the intermediate data in each position in the main scanning direction is acquired based on the image signal of first reference plate 14a, and the first black correction data to be the black correction data that is to be used for the shading correction in the main scanning direction is generated based on the second black data. As a result, the black correction data including an interference noise in the main scanning direction can be obtained. Since the data to be a reference also includes an interference noise, the black correction data in each position in the sub-scanning direction can be generated more accurately.

Further, first reference plate 14a and second reference plate 14b have black regions R2a, R2b, respectively.

Image processor 204 causes the plurality of sensors 207 to acquire image signals with light source 205 being off, and generates the first black data from the image signals. Image processor 204, then, generates the second black data based on the image signal on black region R2a of first reference plate 14a irradiated by light source 205, and generates the first black correction data based on the first black data and the second black data. Image processor 204, then, acquires the third black data based on the image signal on black region R2b of second reference plate 14b irradiated by light source 205.

With this configuration, the first black data is the data of black that is higher in a density level than the second black data. However, since the density level of the black data is high, the output level itself is low, and thus the contained interference noise is small. That is, although the first black data is the data of black at a high density level, the interference noise does not appear appropriately. On the other hand, the second black data is generated based on an image signal that is obtained by causing sensor 207 to acquire a reflected light when black region R2a of first reference plate 14a is irradiated with light, and the third black data is generated based on an image signal that is obtained by causing sensor 207 to acquire a reflected light when second reference plate 14b is irradiated with light. For this reason, the second black data and the third black data are outputs from sensors 207 with a black color lower in a density level than a black color at the highest density level, but these data contain interference noises to a certain extent. Therefore, the black correction data, which is at a high density level and contains an interference noise, can be acquired by generating the first black correction data based on the first black data and the second black data. The black correction data in each position in sub-scanning direction is generated by using the third black data and the first black correction data containing the interference noise in the main scanning direction. As a result, the black correction data in which a fluctuation in the interference noise in the sub-scanning direction is taken into consideration can be acquired.

Further, first reference plate 14a and second reference plate 14b have white regions R1a, R1b, respectively.

Image processor 204 acquires the first white data based on the image signal on white region R1a of first reference plate 14a irradiated by light source 205, and generates the first white correction data that is the white correction data to be used for the shading correction in the main scanning direction in the first position based on the first white data.

Image processor 204, then, acquires the second white data in each position in the sub-scanning direction in the second position based on the image signal on white region R1b of second reference plate 14b irradiated by light source 205. Image processor 204, then, generates white correction data in each position in the sub-scanning direction based on the second white data and the first white correction data. Image processor 204 performs the shading correction using the black correction data and the white correction data in each position in the sub-scanning direction.

With this configuration, the first white data contains the interference noise, and the first white correction data also contains the interference noise. Further, since the second white data also contains the interference noise, a fluctuation in the interference noise in the sub-scanning direction is taken into consideration in the second white correction data generated based on the second white data. For this reason, the white correction data in which a fluctuation in the interference noise in the sub-scanning direction is taken into consideration can be generated by using the first white correction data and the second white correction data containing the interference noises in the main scanning direction. Thus, the shading correction is performed with the black correction data where the fluctuation in the interference noise in the sub-scanning direction is taken into consideration and the white correction data where the fluctuation in the interference noise in the sub-scanning direction is taken into consideration. For this reason, the shading correction can be performed appropriately based on actual outputs from sensors 207.

Further, when the images of the plurality of documents S are sequentially read, image processor 204 acquires the third black data and the second white data at least once before the sequential reading of the images of the plurality of documents S is started.

When the third black data and the second white data are acquired, sensor module 102 should acquire an image of second reference plate 14b while moving in the sub-scanning direction. When the third black data and the second white data are tried to be acquired every time of reading an image of each document S, sensor module 102 should move in the sub-scanning direction every time when reading of one document S is ended. Particularly in the image reading device whose document placing region 4 is wide, it takes a long time to sequentially read images of the plurality of documents S. For this reason, the third black data and the second white data are acquired at least once before the sequential reading is started, so that the time required for the sequential reading of images of the plurality of documents S can be prevented from becoming long.

Second Exemplary Embodiment

A second exemplary embodiment will describe a case where reference sheet 3 is used for acquiring third black data and second white data. That is, in the second exemplary embodiment, reference sheet 3 is a second reference member.

Since parts other than the part of the configuration described here are similar to the first exemplary embodiment, description thereof will be omitted.

[2-1. Acquisition of Data]

Figure 15:
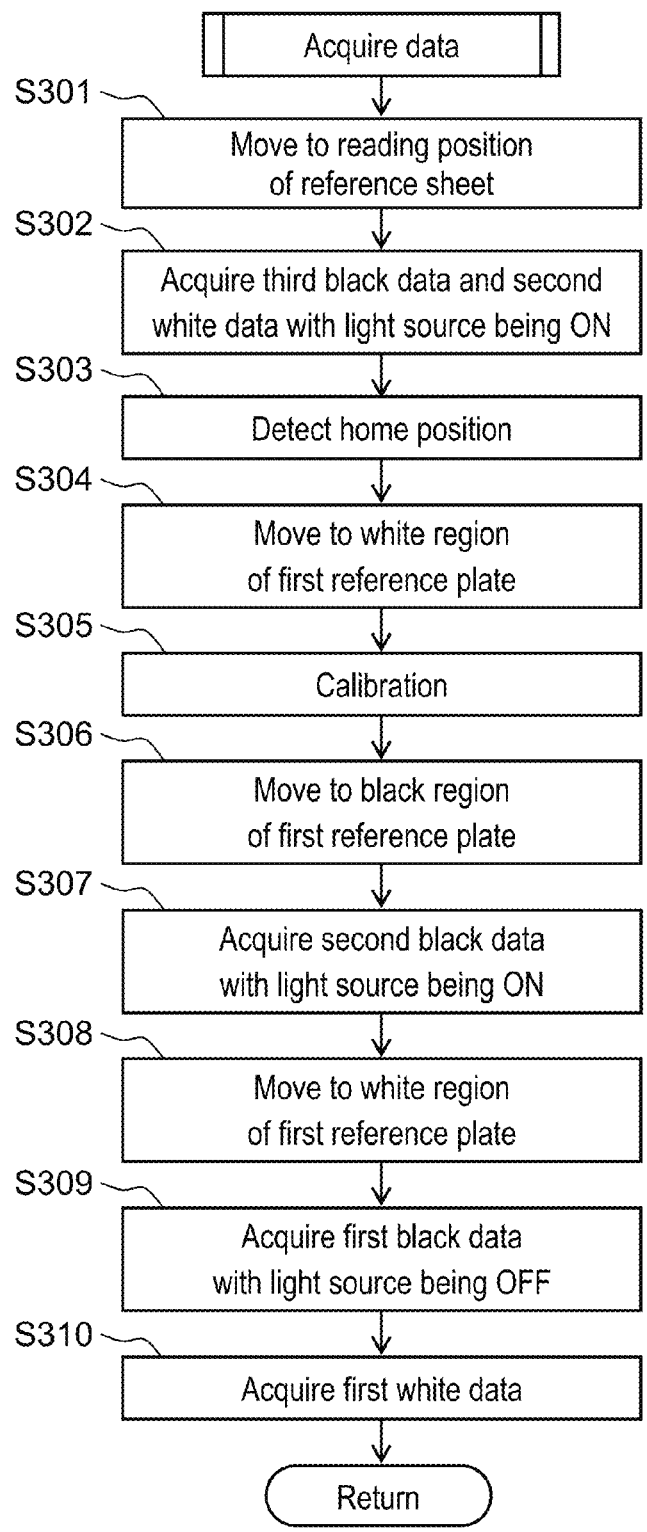
FIG. 15 is a flowchart of a data acquisition process of the image reading device according to a second exemplary embodiment.

Acquisition of data for generating shading data of image reading device 10 in the second exemplary embodiment will be described. FIG. 15 is a flowchart of acquisition of image data in image reading device 10.

In the second exemplary embodiment, after a user places reference sheet 3 on FB glass 12, the user performs a data acquisition operation through an operation unit of image reading device 10 (not shown). As a result, the data acquisition process is started.

Figure 16:
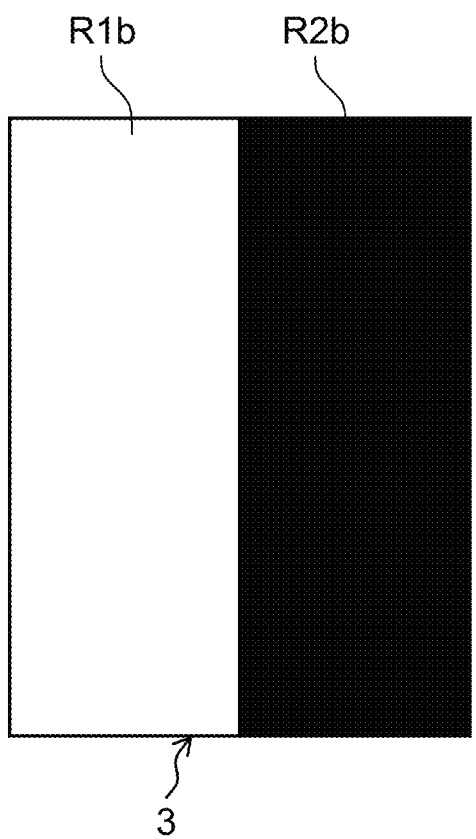
FIG. 16 is a schematic diagram of a reference sheet.

FIG. 16 is a schematic diagram of reference sheet 3. Reference sheet 3 is used for acquiring data necessary for generating correction data, and is attached to image reading device 10. Reference sheet 3 is provided with white region R1b and black region R2b that extend in the sub-scanning direction. Light reflectance of white region R1b is substantially 100%. Lengths of white region R1b and black region R2b in the sub-scanning direction are longer than movable range of sensors 207 in the sub-scanning direction. The user sets reference sheet 3 on a predetermined position on FB glass 12. At this time, a position where reference sheet 3 is disposed is a second position.

A material of reference sheet 3 may be paper or any material other than paper. Further, reference sheet may be printed by image reading device 10.

Image processor 204 moves sensor module 102 to a reading position of reference sheet 3 at step S301.

When the movement is completed, image processor 204 causes light source 205 to irradiate white region R1b and black region R2b of reference sheet 3 and acquire images of white region R1b and black region R2b while causing sensor module 102 to move in the sub-scanning direction at step S302. That is, image processor 204 receives the light reflected from white region R1b and black region R2b, and converts the light into image signals. At this time, since the images are acquired while sensor module 102 is being moved in the sub-scanning direction, the image data includes a fluctuation in the output level in each position in the sub-scanning position. Since light reflectance of white region R1b is substantially 100%, the image data, namely, the white data represents an output level of sensors 207 of white at a lowest density level in the sub-scanning direction. Image processor 204 stores the white data as second white data in memory 203.

Further, an object of reference sheet 3 includes black region R2b, and sensor 207 receives also the light that is emitted from light source 205 and reflected from black region R2b. The image data based on the image signal of black region R2b at this time does not represent an output level of sensor 207 of a black color that is at a highest density level, but represents an output level of sensor 207 of a color close to black at a comparatively high density level in the sub-scanning direction. That is, the image data of black region R2b represents intermediate data that is lower in a density level than black at the highest density level and higher in a density level than white. Image processor 204 stores the image data as third black data in memory 203. The third black data is an example of second intermediate data in the sub-scanning direction.

Thereafter, image processor 204 detects a home position at step S303, and causes sensor module 102 to move to the position facing white region R1a of first reference plate 14a at step S304.

Image processor 204, then, performs calibration at step S305, and when the calibration is ended, causes sensor module 102 to move to black region R2a of first reference plate 14a at step S306.

When the movement to black region R2a is completed, image processor 204 turns on light source 205 to acquire an image at step S307. At this time, the image data of black region R2a represents intermediate data that is lower in a density level than black at the highest density level and higher in a density level than white. Image processor 204 stores the image data as second black data in memory 203.

The second black data is an example of the first intermediate data in the main scanning direction.

Thereafter, image processor 204 causes sensor module 102 to move to white region R1a of first reference plate 14a at step S308, turns off light source 205 so as to acquire an image, and stores the image data, namely, the black data as first black data in memory 203 at step S309. The first black data is an example of the black data.

Image processor 204, then, at step S310, turns on light source 205 to acquire an image, and stores this image dada, namely, the white data as second white data in memory 203.

Since details of the steps are similar to the steps in the first exemplary embodiment, description thereof will be omitted.

Even when the correction data corresponding to the position in the sub-scanning direction are generated by using the data acquired in the second exemplary embodiment, an influence of crosstalk in the main scanning direction and the sub-scanning direction can be reduced.

In this exemplary embodiment, reference sheet 3 is placed on document placing region 4, and the second black correction data and the second white correction data are calculated. For this reason, the correction data in actual document placing region 4 can be calculated, and correcting accuracy is improved.

Other Exemplary Embodiments

The exemplary embodiments have been described above as examples of the technologies disclosed in the present disclosure. However, the technologies of the present disclosure can be applied not only to the above exemplary embodiments but can be also applied to exemplary embodiments in which modification, replacement, addition, or removal is appropriately made. Further, the components disclosed in the above exemplary embodiments can be combined to make a new exemplary embodiment. Further, the components described in the accompanying drawings and in the detailed description include not only components necessary for solving the problems but also the components unnecessary for solving the problems in order to exemplify the above implementation. For this reason, it should not be immediately recognized that those unnecessary components are necessary just because the fact that those unnecessary components are described in the accompanying drawings and the detailed description.

The exemplary embodiments may be configured as described below.

For example, the exemplary embodiments have described the case where the plurality of sensors 207 is divided into three sectors. However, there is no limitation in the division number of sectors.

Further, scanner unit 11 is connected to controller 100 through FFC15, but not limited to this and any communication cable can be used as the wire for connection between scanner unit 11 and controller 100. For example, scanner unit 11 and controller 100 may be connected by FPC (Flexible Printed Circuits) or the like.

Further, the exemplary embodiments have described the case that the reference member for the shading correction is configured by plate-shaped first reference plate 14a and second reference plate 14b. However, the present disclosure is not limited to this case, and the reference member may be achieved by other configuration such that the reference member is provided integrally with a chassis.

Further, the above exemplary embodiments have described the case where image processor 204 generates the first black correction data and the first white correction data that are the correction data for correcting density unevenness of an image in the main scanning direction based on the image signal of first reference plate 14a. However, the present disclosure is not limited to this, and these correction data may be stored in memory 203 in advance.

Further, the order of performing the steps of the flow-charts may be arbitrarily changed as long as a desired object is achieved, and further, some steps can be performed in parallel. For example, the order may be changed between the calibration, the acquisition of the second black data, the acquisition of the first black data, the acquisition of the first white data, and the like.

Further, in the data acquisition, the second black data and the third black data are acquired based on the images of black regions R2a and R2b of first reference plate 14a and second reference plate 14b irradiated by light source 205, without being limited to these images. For example, luminance of the light source is enabled to be adjusted in a plurality of tones, and the second black data and the third black data may be generated based on image signals of white regions R1a and R1b irradiated with light lower in luminance than the time when the first white data and the second white data are acquired.

Further, the above exemplary embodiments have described the case where second reference plate 14b is provided only to one place outside the document placing region, but the present disclosure is not limited to this, and second reference plate 14b may be provided to two or more places outside the document placing region.

Further, the above exemplary embodiments have described the case where the third black data and the second white data are acquired before the reading process, but the present disclosure is not limited to this. Images of black region R2b and white region R1b of second reference plate 14b are acquired simultaneously with the reading process of document S, and the third black data and the second white data may be generated by using these images.

The present disclosure is appropriate to be used in the image reading device that reads images of documents.

What is claimed is:

1. An image reading device that reads an image of an object, the image reading device comprising:
   a sensor module including a light source that irradiates the object and a plurality of sensors that reads light reflected from the object to acquire image signals;
   a data generator that generates black correction data to be a black reference and white correction data to be a white reference that are used for shading correction;
   a storage that stores reference black correction data to be the black correction data to be used for the shading correction in a main scanning direction perpendicular to a predetermined sub-scanning direction in a predetermined first position in the sub-scanning direction, and
   a corrector that performs the shading correction on the image signals acquired by the plurality of sensors using the black correction data and the white correction data,
   wherein
   the plurality of sensors are disposed in the main scanning direction, and the image signals constitute an image signal on a line extending in the main scanning direction,
   the data generator
      acquires second intermediate data that is the intermediate data that is lower in a density level than the black reference and is higher in a density level than the white reference based on an image signal of a second reference member extending in the sub-scanning direction in a predetermined second position in the main scanning direction, and generates the black correction data in each position in the sub-scanning direction based on the second intermediate data and the reference black correction data, and the corrector performs the shading correction using the black correction data in each position in the sub-scanning direction so as to correct density unevenness of an image in the main scanning direction and the sub-scanning direction, the density unevenness being caused by an interference between the image signals from the plurality of sensors.

2. The image reading device according to claim 1, wherein the data generator acquires first intermediate data that is the intermediate data in each position in the main scanning direction in the first position based on an image signal of a first reference member extending in the main scanning direction in the first position, and generates the reference black correction data based on the first intermediate data.

3. The image reading device according to claim 2, wherein the first reference member and the second reference member each have a black region, and the data generator causes the plurality of sensors to acquire image signals with the light source being off so as to generate black data from the image signals, and generates the first intermediate data based on the image signal of the black region of the first reference member irradiated by the light source so as to generate the reference black correction data based on the first intermediate data and the black data, and acquires the second intermediate data based on the image signal of the black region of the second reference member irradiated by the light source.

4. The image reading device according to claim 3, wherein the first reference member and the second reference member further each have a white region, the data generator acquires first white data based on an image signal of the white region of the first reference member irradiated by the light source so as to generate reference white correction data that is the white correction data to be used for the shading correction in the main scanning direction in the first position based on the first white data, acquires second white data in each position in the sub-scanning direction in the second position based on an image signal of the white region of the second reference member irradiated by the light source, and generates the white correction data in each position in the sub-scanning direction based on the second white data and the reference white correction data, and the corrector performs the shading correction using the black correction data and the white correction data in each position in the sub-scanning direction.

5. The image reading device according to claim 4, wherein when images of a plurality of objects are sequentially read, the data generator acquires the second intermediate data and the second white data in each position in the sub-scanning direction at least once before sequential reading of the images of the plurality of objects is started.

* * * * *